(12) United States Patent
Taniguchi et al.

(10) Patent No.: US 9,475,147 B2
(45) Date of Patent: Oct. 25, 2016

(54) METHOD OF RESISTANCE SPOT WELDING OF HIGH TENSILE STRENGTH STEEL SHEET AND WELDING JOINT MANUFACTURED BY THE METHOD

(71) Applicant: JFE STEEL CORPORATION, Tokyo (JP)

(72) Inventors: Koichi Taniguchi, Chiba (JP); Yasuaki Okita, Chiba (JP); Rinsei Ikeda, Chiba (JP)

(73) Assignee: JFE STEEL CORPORATION, Tokyo (JP)

( * ) Notice: Subject to any disclaimer, the term of this patent is extended or adjusted under 35 U.S.C. 154(b) by 362 days.

(21) Appl. No.: 14/351,926

(22) PCT Filed: Oct. 17, 2012

(86) PCT No.: PCT/JP2012/077382
§ 371 (c)(1),
(2) Date: Apr. 15, 2014

(87) PCT Pub. No.: WO2013/058406
PCT Pub. Date: Apr. 25, 2013

(65) Prior Publication Data
US 2014/0305912 A1    Oct. 16, 2014

(30) Foreign Application Priority Data

Oct. 18, 2011  (JP) ................ 2011-228406

(51) Int. Cl.
*B23K 11/00* (2006.01)
*B23K 11/11* (2006.01)
*B23K 11/24* (2006.01)
*B23K 11/25* (2006.01)

(52) U.S. Cl.
CPC .............. *B23K 11/115* (2013.01); *B23K 11/24* (2013.01); *B23K 11/241* (2013.01); *B23K 11/257* (2013.01)

(58) Field of Classification Search
CPC ... B23K 11/115; B23K 11/24; B23K 11/241; B23K 11/257; B23K 11/00

USPC ........ 219/91.22, 91.2, 91.21, 602, 603, 617, 219/50, 54, 55, 78.01
See application file for complete search history.

(56) References Cited

U.S. PATENT DOCUMENTS 8,283,591 B2 * 10/2012 Kitagawa ................ B23K 11/11
                                                    219/110
8,779,320 B2 *  7/2014 Watanabe ............. B23K 11/115
                                                    219/55

(Continued)

FOREIGN PATENT DOCUMENTS

JP     A-58-3792       1/1983
JP     A-2002-103048   4/2002

(Continued)

OTHER PUBLICATIONS

G. Shi et al., 1st International Conference Super-high Strength Steels Proceedings: *Techniques for Improving the Weldability of Trip Steel Using Resistance Spot Welding*, 2005.

(Continued)

*Primary Examiner* — Justin Jonaitis
(74) *Attorney, Agent, or Firm* — Oliff PLC

(57) ABSTRACT

Provided is a method of resistance spot welding of welding a sheet set including a high strength steel sheet with which a high joint strength can be achieved even for a high Ceq material. A method of resistance spot welding a sheet set of two or more lapped steel sheets by weld the sheet set while clamping and pressing the sheet set between a pair of welding electrodes includes a first welding step of applying an weld current Im (kA) and forming a nugget having a nugget diameter d (mm) that satisfies the following inequality (1); a cooling step, subsequent to the foregoing first welding, of cooling the sheet set while continuing to press the sheet set; and a second welding step of performing two-step welding, $$3 \times \sqrt{t_m} \leq d \leq 6 \times \sqrt{t_m} \qquad (1),$$

where $t_m$ is the thickness (mm) of the thinnest one of the foregoing two or more steel sheets.

8 Claims, 2 Drawing Sheets

(56) References Cited

U.S. PATENT DOCUMENTS

2009/0011269 A1* 1/2009 Urushihara ........... B23K 11/115
428/594
2012/0241416 A1* 9/2012 Sakamoto ............. B23K 11/115
219/91.2
2015/0174690 A1* 6/2015 Furusako ............... B23K 11/16
219/91.22

FOREIGN PATENT DOCUMENTS

| JP | A-2008-93726 | 4/2008 |
|---|---|---|
| JP | A-2009-241086 | 10/2009 |
| JP | A-2010-115706 | 5/2010 |
| JP | A-2010-172946 | 8/2010 |
| JP | A-2010-207909 | 9/2010 |
| WO | 2008/058675 A1 | 5/2008 |

OTHER PUBLICATIONS

B. Girvin et al., Technology Roadmap Program: *Development of Appropriate Spot Welding Practice for Advanced High-Strength Steels*, 2004.

* cited by examiner

METHOD OF RESISTANCE SPOT WELDING OF HIGH TENSILE STRENGTH STEEL SHEET AND WELDING JOINT MANUFACTURED BY THE METHOD

TECHNICAL FIELD

The present invention relates to a method of resistance spot welding, which is a type of resistance welding, and a joint manufactured by the method of resistance spot welding. In particular, the present invention relates to a method of resistance spot welding a sheet set including a high strength steel sheet whose Ceq is 0.28 or more, with which a joint with higher cross tension strength is manufactured in a shorter time than that by conventional method.

BACKGROUND ART

In recent years, the weight of automobile bodies has been reduced to improve fuel economy and to reduce $CO_2$ emission. Steel is used as the material of most parts of an automobile because there is a good balance between the cost, formability, and strength of steel. Steel parts have been reduced in weight by reducing their thickness. On the other hand, a higher joint strength is required to ensure the safety of an automobile body. Studies have been made to ensure the reliability of an automobile body by increasing the tensile strength of base metal in body parts while reducing the thickness of the automobile body parts.

Welding is necessary in assembling an automobile body, and the quality of a weld is directly linked to the reliability of an automobile body. Among welding methods used to assemble an automobile body, resistance spot welding has advantages of low operation cost and high degree of flexibility in welding positions. Welding is performed at several thousand spots in each automobile body. Therefore, resistance spot welding has an important function in ensuring reliability of an automobile body.

As illustrated in FIG. 1, resistance spot welding is a method of obtaining a welded joint by clamping a sheet set 3 of two or more lapped steel sheets (here, two sheets comprising of a lower steel sheet 1 and an upper steel sheet 2) between a pair of upper and lower electrode tips (a lower electrode tip 4 and an upper electrode tip 5), pressing and weld the sheet set so as to melt the steel sheet, and forming a nugget 6 having a necessary size.

The quality of the joint obtained in this way is evaluated in terms of the diameter of the nugget, whether full penetration is achieved, the tensile shear strength (the strength of a joint when a tensile test is performed by applying tension in a shearing direction of the joint), the cross tension strength (the strength of a joint when a tensile test is performed by apply tension in a peeling direction of the joint), the fatigue strength, and the like. Among these, the static strengths, which are typically measured by the tensile shear strength and the cross tension strength, are important as an index of the quality of the joint.

It is known that the tensile shear strength of a spot welded joint tends to increase as the tensile strength of a steel sheet increases. However, the cross tension strength may increase only negligibly as the tensile strength of a steel sheet increases, or may decrease on the contrary. It is considered that this is because the carbon equivalent Ceq of a steel sheet, which is represented by the following equation or the like, increases as the strength of the steel sheet increases, and when steel sheets with a high Ceq value are welded, the hardness of the weld and the heat affected zone increases as the steel sheet is subjected to a heat cycle including rapid heating and rapid cooling, and thereby the toughness of the weld decreases.

$$Ceq = C + \frac{1}{30} \times Si + \frac{1}{20} \times Mn + 2P + 4S(\%)$$

In order to ensure the strength of a welded joint manufactured by resistance spot welding of high strength steel sheets, the welding method may be improved by increasing the number of welds or by increasing the nugget diameter. However, because a larger welding workspace is necessary to increase the number of welds, increase in the number of welds would increase the operation time and decrease the productivity. To increase the nugget diameter, it is necessary to increase the size of electrodes and increase the electrode force applied to the steel sheets to prevent expulsions. These are constrained by the equipment and also have a disadvantage that the characteristics of a base metal may be impaired because the heat affected zone is enlarged.

Therefore, in order to ensure the strength of a welded joint with a nugget diameter that is equal to or smaller than those of existing methods, in-process postheating treatment methods, in which is performed after main current for forming a nugget, have been developed. In particular, a method to temper martensite (hereinafter referred to as "tempering method) is a method in which a weld is temporarily cooled and then reheated. With this method, a nugget is temporarily solidified, transformed to hard martensite, and then reheated, and thereby a nugget and a heat affected zone (HAZ) are softened. As a result, the toughness of the nugget is increased and the stress concentration in the vicinity of the weld is reduced, and thereby increase in the strength of the joint can be realized. A large number of studies have been made on this method.

For example, Patent Literature 1 describes that it is preferable that the product of the square of (It/To) and (Tt/To) is in the range of 0.25 to 0.82, where Tt and It are the weld time and the weld current of in-process tempering treatment, respectively and To and To are the weld time and the weld current of main welding, respectively.

Non Patent Literature 1 describes that static strength is increased by performing in-process tempering treatment on steel sheets having a thickness of 1.05 mm and the total time required for in-process postheating treatment is 0.9 seconds, including a cooling time of 0.4 seconds and a in-process tempering treatment time of 0.5 seconds.

Patent Literature 2 describes that the cross tension strength of high tensile strength steel sheets can be increased by performing in-process treatment with a weld current that is lower than or equal to the main welding current after performing the main welding, and by changing the holding time after the welding in accordance with the thickness of the steel sheets.

Patent Literature 3 describes that the cross tension strength of a joint manufactured by welding steel sheets having a tensile strength in the range of 900 to 1850 MPa can be increased by, after performing main welding, performing welding for 40 to 80 ms with an weld current that is in the range of 70 to 90% of the main welding current, or performing, after a cooling time of 20 ms, welding for 40 to 200 ms with an weld current in the range of 40 to 70% of the main welding current.

In recent years, as described in Patent Literature 4 and Non Patent Literature 2, methods of improving the cross tension strength by performing a certain cooling and then performing welding for about 2 to 4 cycles (40 to 80 ms) have been proposed. Non Patent Literature 2 describes that an effect equivalent to that of a tempering method can be obtained by performing cooling for about 40 cycles (0.8 s) and then performing welding. Patent Literature 4 describes that a specific thermal effect is obtained by applying an weld current near the upper limit at which expulsion occurs, and thereby an effect equivalent to that of a tempering method can be obtained.

In recent years, pulsation methods, which are different from tempering methods and in which cooling and welding are alternately repeated, have been studied. For example, Patent Literature 5 describes that the strength of a joint can be increased in a shorter weld time than tempering methods by, after performing main welding for forming a nugget, holding a sheet set in a non-welding state, performing welding for a short time using an weld current higher than the main weld current, and repeating this cycle for a plurality of times.

There is a problem in that, when welding a sheet set including a thin sheet and two thicker sheets, it is difficult to form a fusion zone between the thin sheet and the thicker sheets. Patent Literature 6 describes that, for a sheet set including three or more such sheets, a sufficient nugget diameter can be formed by performing pulsation welding in which cooling and welding are alternately repeated after having performed main welding.

Patent Literature 7 describes that a nugget can be formed without causing expulsion by, after performing main welding for forming the nugget, performing welding with a lower weld current, performing welding for a short time using an weld current higher than the main weld current, and repeating this cycle for a plurality of times.

CITATION LIST

Patent Literature

PTL 1: Japanese Unexamined Patent Application Publication No. 58-003792
PTL 2: Japanese Unexamined Patent Application Publication No. 2002-103048
PTL 3: Japanese Unexamined Patent Application Publication No. 2009-241086
PTL 4: Japanese Unexamined Patent Application Publication No. 2010-172946
PTL 5: Japanese Unexamined Patent Application Publication No. 2010-115706
PTL 6: Japanese Unexamined Patent Application Publication No. 2008-093726
PTL 7: Japanese Unexamined Patent Application Publication No. 2010-207909

Non Patent Literature

NPL 1: 1st International Conference Super-high Strength Steels Proceedings, G. Shi et al., Techniques For Improving The Weldability of Trip Steel Using Resistance Spot Welding, 2005
NPL 2: AISI/DOE Technology Roadmap Program, DE-FC36-97ID13554, B. Girvin et al., Development of Appropriate Spot Welding Practice for Advanced High-Strength Steels, 2004

SUMMARY OF INVENTION

Technical Problem

However, existing in-process tempering treatment methods and pulsation welding methods have many problems.

First, the available range of weld current that is used in the welding methods described in Patent Literatures 1 to 3 is narrow, because the weld current is selected so as to enable sufficient resistance heating with a current lower than or equal to the main weld current. Therefore, these methods are greatly influenced by slight changes in weld current and weld time. As a result, these methods have a problem in that they do not have sufficiently wide conditions that allows them to be implemented and stably carried out in a manufacturing site, in which various disturbances occur (for example, a large decrease in weld current that exceeds 50% of the main weld current may occur). In addition, in order to effectively generate heat by using an weld current that is lower than or equal to the main weld current, a sufficient weld time (at least 0.5 seconds or more according to Non Patent Literature 1) is required, and therefore the total weld time (defined as the time from when the first welding is started to when the last welding is finished), including a cooling time, may be increased.

When applying a high weld current only once for a short time as described in Patent Literature 4 and Non Patent Literature 2, the weld current is set at a level near the upper limit at which expulsion occurs in order to obtain an effect. However, there is a problem in that a gap may be formed between sheets if the accuracy of machining or assembly is low and the gap may cause expulsion.

In addition, as carried out or described in Non Patent Literatures 1 and 2, in general in-process tempering treatment methods, tempering is performed by performing welding after sufficient cooling. Therefore, a sufficient cooling time is required (according to Non Patent Literature 1, for a sheet having thickness of 1.05 mm, at least 20 cycles (0.4 seconds), and 20 cycles (0.4 seconds) or more when it is necessary to stably obtain the effect or when the thickness is increased), and there is a problem in that the total weld time is increased.

Moreover, in Patent Literatures 4 and 5, a nugget formed by main welding is enlarged by performing in-process postheating treatment, and thereby a fusion zone is secured. To date, the strength of a joint has been examined and evaluated with respect to the final nugget diameter irrespective of whether in-process postheating treatment is performed or not, because it has been considered that there is a close relationship between the nugget diameter and the strength of a joint. However, although it is no doubt important to increase the strength by increasing the nugget diameter as describe above, it is impossible to increase the strength of a joint because the nugget and the HAZ are rapidly cooled from a melted state.

The idea described in Patent Literature 6 is different from the in-process tempering treatment described above in that the strength of a joint is increased by controlling the temperature history of a heat affected zone in a plurality of ways. However, as the carbon-equivalent increases, a simple repetition pattern becomes less effective. Moreover, because the tact time increases as the number of repetition increases, it is considered that a large number of improvements have to be made.

An object of the present invention is to provide a method of resistance spot welding of a sheet set including a high strength steel sheet with which the aforementioned problems are solved and a high joint strength can be achieved even for a steel with higher Ceq.

Solution to Problem

To solve the aforementioned problems, the inventors carried out an intensive study on a method of improving the strength of a joint manufactured by resistance spot welding of a sheet set including a high tensile strength steel sheet.

Tensile shear strength and cross tension strength are typical measures of the static strength of a resistance spot welded joint. The inventors regard the cross tension strength as more important than the tensile shear strength in examining the joint strength of high strength steel sheets because the tensile shear strength tends to increase as the strength of a steel sheet increases. It is known that there is a correlation between the cross tension strength and the fracture pattern of a resistance spot welded joint. That is, a interface fracture, which is parallel to the steel sheets, occurs in a low strength weld, and as the strength increases, the fracture pattern shifts to a plug fracture, in which one of the steel sheets comes off while the other steel sheet is left in a button-like shape.

Because interface fracture is a kind of brittle fracture, interface fracture has been studied by focusing on the concentration of stress at the edge of a nugget near the interface. Patent Literatures 1 to 5 achieve the object of improving the joint strength by reducing the concentration of stress by suppressing hardening or softening of a nugget or a heat affected zone.

However, it is assumed in these literatures that the criteria for brittle fracture of a nugget in themselves do not change and they do not discuss improvement of the criteria. The inventors examined the criteria and improvement of the criteria.

Therefore, the inventors performed numerical analysis of cross tension testing and evaluated a stress intensity factor at an edge of a nugget. As a result, the inventors found that the stress intensity factor under a constant load decreases with statistical significance when the nugget is softened or when the heat affected zone is softened, respectively. It can be explained that this is because the angle of a notch tip adjacent to an edge of a nugget is increased because of softening of the nugget or the heat affected zone.

It has been pointed out that the presence of P (phosphorus) or S (sulfur) is a factor that influences the characteristics of a nugget. Sample steel sheets including approximately the same amount of C (carbon) and different amounts of P and S and having approximately the same hardness and tensile strength were manufactured and the cross tension strengths of these samples were compared with each other. As a result, as the amounts of P and S increased, the fracture strength decreased and the occurrence of interface fracture increased.

The influence of P and S was evaluated in detail. The microstructure of a nugget was observed and it was found that the cell structure of a portion etched with picric acid did not coincide with those of martensite grains. By EPMA observation, it was found that Si (silicon), Mn (manganese), and P are highly unevenly distributed in a region etched with picric acid, and it was considered that solidification segregation occurred in this region. In particular, P cohered with a higher density than Si and Mn. It is supposed that this is because P has a melting point lower than those of the other elements. The cross tension testing was stopped at a certain load, and the position at which a crack propagated in the nugget was examined. As a result, it was found that the position where P was unevenly distributed was overlapped the path along which a crack propagated.

Therefore, it is supposed that the relationship between a welding process and fracture of a nugget is as follows. First, due to rapid solidification of a nugget, impurities, in particular, P and S are pushed to the outside of a dendrite structure, and segregation occurs. Subsequently, although austenite grains are formed, the structures of the austenite grains do not necessarily coincide with the state of segregation. When cooling progresses further, martensitic transformation occurs, and the segregation portion of P and S in the martensite grains induces brittle facture of a nugget. Therefore, the inventors considered that the criteria can be improved by reducing segregation of P and S, and further continued examination.

First, the inventors examined whether or not an effect can be obtained by changing the solidification rate. However, when welding with a low weld current was continued after a nugget had been formed, solidification segregation increased. Because segregation generally tends to become finer as the cooling rate increases, it is important to first perform cooling rapidly.

Next, the state of P after rewelding was examined. In general, an element becomes dispersed in a shorter time when the temperature of the element is higher, and it takes a longer time for the element to become dispersed when the temperature is lower. On the other hand, because P is segregated in austenite grains, if dispersion of P is continued for a long time, it is estimated that P may cohere in austenite grain boundaries and may cause intergranular fracture. Actually, although segregation of P was reduced when in-process tempering treatment was performed as compared with when in-process tempering treatment was not performed, segregation to grain boundaries occurred and the joint strength decreased when the welding was performed for a long time. Moreover, also with the method described in Patent Literature 6, segregation of P was slightly reduced. It is supposed that, by using a high weld current, a large effect was obtained even in a short time.

However, when a nugget formed by performing only a second welding step for postheating after main welding (first welding step) was compared with a nugget formed by additionally performing a third welding step for postheating, the effect of reducing segregation of P was smaller for the nugget formed by additionally performing the third welding step. It is estimated that the effect of reducing segregation of P after the first in-process postheating treatment (second welding step) was small because the temperature of a nugget decreases sharply as the nugget is cooled in a cooling step (B) before the second in-process postheating treatment (third welding step). Thus, the inventors found that, in order to increase the effect of reducing segregation of P, it is necessary to maintain a high temperature after rapid cooling.

On the other hand, as has been known, it is also important to reduce stress concentration by softening a heat affected zone. A heat affected zone of a high tensile strength steel sheet includes a hardened portion that is in the vicinity of a nugget and becomes harder than a base metal and a softened portion that is in the outer periphery of the hardened portion and becomes softer than the base metal. The inventors evaluated the influence of the hardened portion and the softened portion by performing a numerical analysis and found that stress concentration at an edge of a nugget is reduced and fracture at the nugget can be prevented by softening the hardened portion or reducing the region of the hardened portion or by further softening the softened zone or increasing the region of the softening zone. The regions of a hardened zone and a softened zone may refer to the area of the softened zone or a region corresponding to the width of the softened zone in a cross-sectional view of a joint. In the present invention, attention is given to increasing the region of a softened zone.

A softened zone of a nugget is a zone to which heat generated in the nugget is transferred and the temperature thereof increases to a temperature that is lower than or equal to the austenitizing temperature. The region of the softened zone may be increased by maintaining the amount of heat transferred from the nugget at a certain level. It was considered that appropriate control is not performed with the method described in Patent Literature 6, in which welding with a high weld current is simply performed, because the temperature of the softened zone gradually increases and there are some zones that harden after the temperature has entered the austenite range.

On the basis of such examinations, the inventors further examined a method of maintaining the temperature of a softened zone while maintaining a high temperature after a nugget has been rapidly cooled. As a result, the inventors found the following welding pattern. First, main welding is performed, and then cooling is performed in a cooling step. Next, two-step welding is performed in a second welding step, that is, a high current is applied so as to increase temperature and then welding is continued with a lower current. With this welding pattern, the temperature of a nugget can be rapidly decreased and then increased, and the temperature of a softened zone can be appropriately maintained while preventing the temperature of the softened zone from increasing excessively.

Moreover, to enlarge the region of a softened zone, it is necessary to increase the temperature of a base metal outside of the softened zone. Because the temperature of a zone near a hardened zone tends to become higher when welding is continued, it is important to repeat welding and cooling in a non-welding state. By performing experimental examination, the inventors found that highly efficient heat transfer can be realized by strictly defining the cooling time in accordance with the sheet thickness. Therefore, by repeating cooling in a cooling step and welding in addition to the aforementioned welding pattern, the region of the softened zone can be enlarged further. By dividing welding in this case into two steps and making the weld current of a post-step is lower than that of a pre-step, softening can be efficiently realized. Although the effect can be increased by repeating such cooling in the cooling step and welding, the weld time is increased due to the repetition. Therefore, it is preferable that the number of repetitions is at most two.

By using this welding method, the proportion of a region in which the density of P becomes high due to segregation can be made to be lower than that of existing welding methods, when the segregation state of P in a nugget is analyzed using EPMA or the like.

By using this method, the joint strength can be considerably increased when welding a high tensile strength steel sheet having a tensile strength of 440 MPa or more, for which hardening progresses significantly due to rapid cooling and the cross tension strength considerably decreases.

Thus, the inventors succeeded in developing a welding method with which a joint having a higher strength can be obtained in a shorter time than existing welding methods by achieving reduction in segregation of P in a nugget and enlargement of a softened zone by performing in-process postheating treatment (second welding step or third welding step), a cooling step (A) and/or (B) described above, and two-step welding in the second welding step.

On the basis of the findings described above, the present invention has the following characteristics.

[1] A method of resistance spot welding a sheet set of two or more lapped steel sheets by weld the sheet set while clamping and pressing the sheet set between a pair of welding electrodes includes:

a first welding step of applying an weld current Im (kA) and forming a nugget having a nugget diameter d (mm) that satisfies the following inequality (1);

a cooling step (A), subsequent to the first welding step, of cooling the sheet set while continuing to press the sheet set; and a second welding step of performing two-step welding of applying weld currents that satisfy the following inequalities (2) and (3).

$$3 \times \sqrt{t_m} \leq d \leq 6 \times \sqrt{t_m} \quad (1)$$

Here, $t_m$ is the thickness (mm) of the thinnest one of the two or more steel sheets.

$$Im < I_{21} < Im \times 2.0 \quad (2)$$

$$I_{22} < I_{21} \quad (3)$$

Here, $I_{21}$ and $I_{22}$ are respectively the weld currents (kA) of a pre-step and a post-step of the two-step welding.

[2] In the method of resistance spot welding according to Claim 1, a time Tc1 of the cooling step (A) subsequent to the first welding step satisfies the following inequality (4), $$t/2 < Tc1 < t \times 5 \quad (4),$$

where t is the total thickness (mm) of the sheet set and the unit of time is (cycles/50 Hz).

[3] In the method of resistance spot welding according to [1] or [2], a total weld time $T_2$ of the second welding step satisfies the following equation (5) and inequality (6), $$T_2 = T_{21} + T_{22} \quad (5),$$

where $T_{21}$ and $T_{22}$ are respectively weld times of the pre-step and the post-step, $$T_2 < t \times 5 \quad (6),$$

where t is the total thickness (mm) of the sheet set and the unit of time is (cycles/50 Hz).

[4] In the method of resistance spot welding according to any one of [1] to [3], the method further sequentially includes:

a cooling step (B) of continuing to press the sheet set after the second welding step; and a third welding step of applying an weld current that satisfies the following inequality (7), $$I_3 33 \ I_3 \times T_3 < I_{21} \times I_{21} \times T_{21} + I_{22} \times I_{22} \times T_{22} \quad (7),$$

where $I_3$ is the weld current (kA) of the third welding step, $I_{21}$ and $I_{22}$ are respectively the weld currents (kA) of the pre-step and the post-step of the two-step welding, $T_3$ is an weld time of the third welding step, $T_{21}$ and $T_{22}$ are respectively the weld times of the pre-step and the post-step, and the unit of time is (cycles/50 Hz).

[5] In the method of resistance spot welding according to [4], a time Tc2 of the cooling step (B) subsequent to the second welding step satisfies the following inequality (8), $$Tc^{1/5} < Tc2 \leq Tc1 \quad (8),$$

where Tc1 is the time of the cooling step (A) subsequent to the first welding step, and the unit of time is (cycles/50 Hz).

[6] In the method of resistance spot welding according to [4] or [5], two-step welding is performed in the third welding step instead of one-step welding.

[7] In the method of resistance spot welding according to any one of [4] to [6], the cooling step (B) subsequent to the second welding step and the third welding step are repeated once or twice.

[8] In the method of resistance spot welding according to any one of [1] to [7], at least one of the two or more steel sheets satisfies the following inequality.

$$0.25 < Ceq < 0.6$$

Here, Ceq=C+1/30×Si+1/20×Mn+2×P+4×S (%), in which the right side is the contents (mass %) of elements included in the at least one of the steel sheets.

Advantageous Effects of Invention

With the present invention, a weld with a cross tension strength higher than those of welds made by using existing methods can be manufactured by resistance spot welding a sheet set of two or more steel sheets including at least one or more high tensile strength steel sheets.

DESCRIPTION OF EMBODIMENTS

Hereinafter, an embodiment of the present invention will be described with reference to the drawings.

Figure 1:
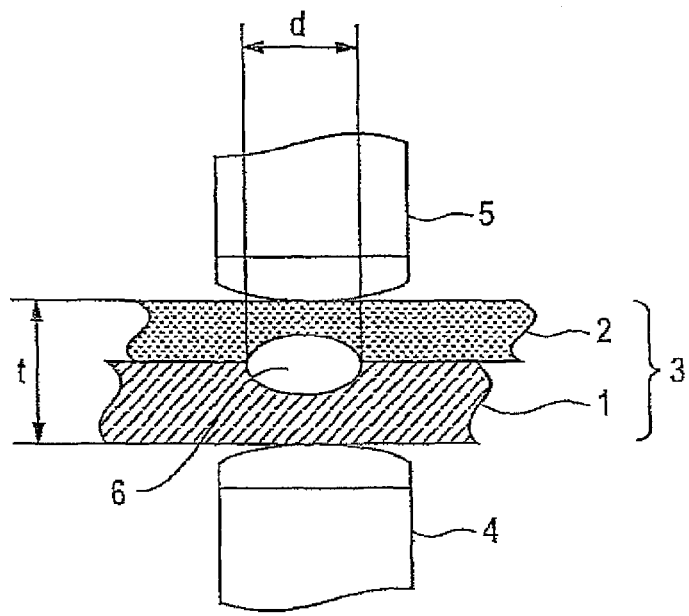
FIG. 1 illustrates the configuration of resistance spot welding.

As illustrated in FIG. 1, a method of resistance spot welding according to an embodiment of the present invention is a method of obtaining a resistance spot weld by clamping a sheet set 3 of lapped steel sheets, which includes one or more high strength steel sheet (here, a lower steel sheet 1 is a high strength steel sheet among a lower steel sheet 1 and an upper steel sheet 2), between a pair of upper and lower electrode tips (a lower electrode tip 4 and an upper electrode tip 5); pressing and weld the sheet set using a resistance spot welding so as to weld the sheet set; and forming a nugget 6 having a necessary size.

A welding machine that can be preferably used in the embodiment may include a pair of upper and lower electrode tips, can press and welding a portion by clamping between the pair of electrode tips, and may include a pressure controller and a welding current controller that can control the pressure and welding current appropriately during welding, respectively. The mechanism for pressing (an air cylinder, a servo motor, or the like), the mechanism for controlling an weld current (whether to use an alternating current, a direct current, or the like), and the type (a stationary type, a robot gun, or the like) and the like are not particularly limited. In the description below, the unit of weld time means (cycles/50 Hz), that is, 0.02 s, unless otherwise noted. The unit may be simply represented as "cycles".

Figure 2:
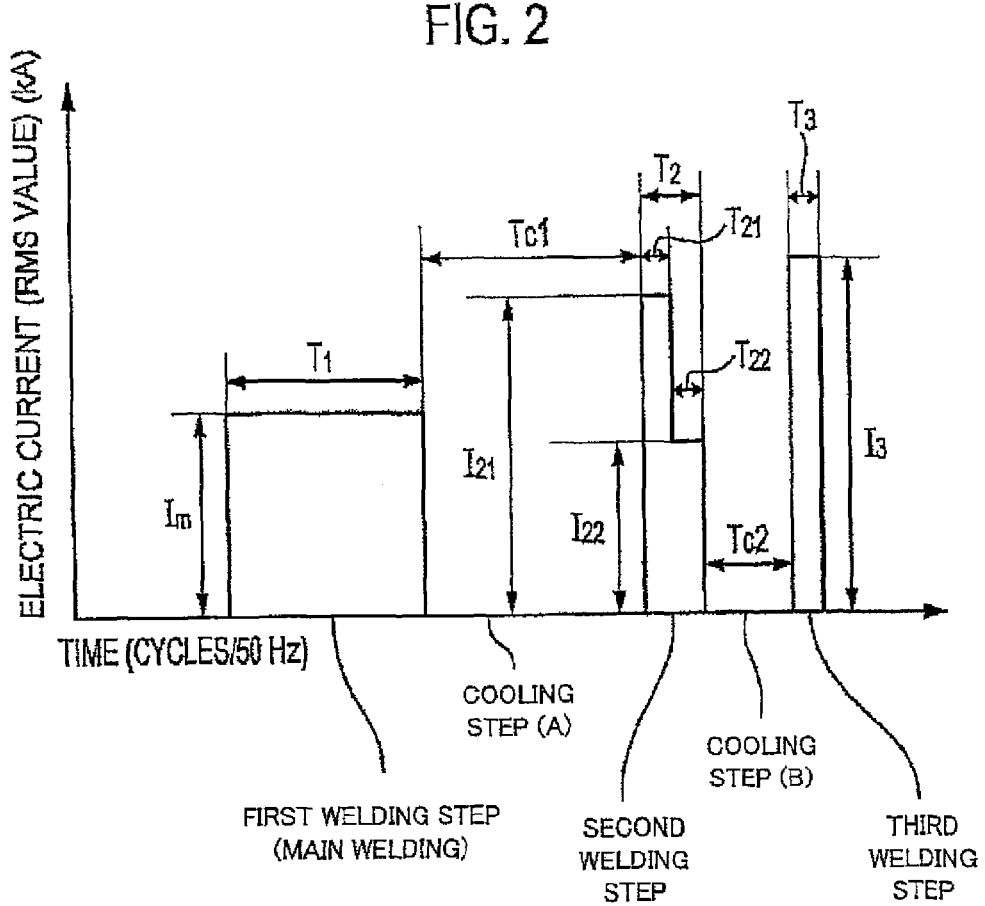
FIG. 2 is a diagram illustrating the relationship between the weld current and the time in an embodiment according to the present invention (EXAMPLE 1).

FIG. 2 illustrates the process for carrying out the embodiment of the present invention. The vertical axis represents the weld current (RMS value) and the horizontal axis represents the time.

First Welding Step

A first welding step (also referred to as "main welding") is a step of applying an weld current Im (kA) to a sheet set of two or more lapped steel sheets, which includes at least one or more high tensile strength steel sheets, while clamping and pressing the sheet set between a pair of welding electrodes, and thereby forming a nugget having a nugget diameter d that satisfies $$3 \times \sqrt{t_m} \le d \le 6 \times \sqrt{t_m} \tag{1}$$

where $t_m$ (mm) is the thickness of the thinnest one of the steel sheets.

Here, the nugget diameter d is determined to be larger than or equal to $3 \times \sqrt{t_m}$ because it is necessary that the nugget has a certain size for the present invention to be effective. The nugget diameter d is determined to be equal to or smaller than $6 \times \sqrt{t_m}$ because, if the nugget is excessively large, the cooling rate decreases and the nugget may remelt due to in-process postheating treatment.

It is preferable that the weld time of the first welding step is in the range of 5 to 25 cycles. By performing the first welding step, an appropriate nugget can be obtained.

Cooling Step (A) Subsequent to First Welding Step

The nugget is rapidly cooled and solidified in a cooling step (A). In this step, which is performed after the first welding step, the sheet set is cooled in a non-welded state while continued to be pressed, and thereby a fine solidification microstructure can be formed. It is preferable that a cooling time Tc1, which is the time during which this step is performed, satisfies the following inequality (4), which defines a lower limit for ensuring solidification and an upper limit for preventing excessive cooling and effectively obtaining the effect of the next step. By performing the cooling step (A), the structure of segregation that is generated when the nugget solidifies becomes finer, and it is important to firstly cool the nugget rapidly. The sheet set is cooled in a non-welded state while continued to be pressed in order to increase the cooling rate.

$$t/2 < Tc1 \text{ (cycles/50 Hz)} < t \times 5 \tag{4}$$

Here, t is the total thickness (mm) of the foregoing sheet set, and (cycles/50 Hz) means 0.02 s.

By doing so, the effect of reheating after cooling can be maximally obtained. The relationship $t/2 < Tc1$ (cycles/50 Hz) is determined because it is necessary to define the shortest cooling time to ensure a certain level of solidification, and the shortest cooling time should be defined in accordance with the total sheet thickness because the cooling rate of cooling a nugget decreases as the total thickness increases. Moreover, the relationship $Tc1$ (cycles/50 Hz)$<t \times 5$ is determined because a result was obtained such that it is sufficient to cool the nugget for a time that is 5 times the total sheet thickness so that the nugget can be cooled to a level that is sufficient for the present invention. At this time, it is preferable that the cooling time Tc1 of the cooling step (A) is less than or equal to 4 times t, because, if Tc1 is too long, the steel sheet may become excessively cooled and it may become difficult to control the effect of heat treatment in subsequent welding.

Second Welding Step of Performing Two-Step Welding

Next, a second welding step of performing two-step welding is performed. The second welding step includes two steps and welding is performed such that, with respect to the weld current Im, which performs an important function of forming a nugget in the first welding step, the weld current $I_{21}$ in a pre-step of the two steps satisfies $$Im < I_{21} < Im \times 2.0 \tag{2},$$

and such that the weld current $I_{22}$ in a post-step of the two steps satisfies $$I_{22} < I_{21} \tag{3}.$$

The relationship $Im < I_{21}$ is determined so that the effect of reheating can be obtained in a short time, and the relationship $I_{21} < Im \times 2.0$ is determined because remelting and expulsion may occur if an excessively high weld current is applied. The relationship $I_{22}<I_{21}$ is determined so that the temperature of a softened zone can be prevented from becoming excessively high.

By determining such relationships, the nugget can be stably maintained at a high temperature.

To perform rapid heating without causing expulsion and to appropriately maintain the temperature, it is preferable that the weld current $I_{21}$ of the pre-step is 1.2 or more and 1.8 or less ($Im \times 1.2 \leq I_{21} \leq Im \times 1.8$) and $I_{22}$ is ½ of $I_{21}$ or more ($I_{21} \times ½ \leq I_{22} < I_{21}$). Adding an upslope before the weld current $I_{21}$ and adding a downslope after $I_{22}$ in the second welding step are within the scope of the present invention.

Total Weld Time $T_2$ of Second Welding Step

It is preferable that welding is performed such that, when the total weld time $T_2$ of the second welding step is represented as the sum of the weld time $T_{21}$ of the pre-step and the weld time $T_{22}$ of the post-step as in the following equation $$T_2 = T_{21} + T_{22} \quad (5),$$

$T_2$ has the following relationship with the total thickness t (mm) of the sheet set $$T_2 (\text{cycles}/50\ Hz) < t \times 5 \quad (6).$$

In this case, it is more preferable that $T_2$ satisfies at least a relationship $t/2 < T_2$, because it is difficult to obtain a heating effect if $T_2$ is too short, and satisfies a relationship $T_2 \leq t \times 3$, because the workability decreases if $T_2$ is too long. In a case where an upslope or a downslope is added, it is preferable that the set time of the upslope or the downslope is shorter than $T_2$.

Cooling Step (B) Subsequent to Second Welding Step, in Which Pressing is Continued in Non-Welded State It is preferable that the welding operation according to the embodiment of the present invention includes a cooling step (B) subsequent to the second welding step, which is performed for a time Tc2 and in which pressing is continued in a non-welded state. Pressing is continued in the cooling step (B) in order to cool the nugget with the electrodes. The cooling step (B) needs not necessarily be performed. However, the cooling step (B) has a function of readjusting heat generated in the second step and making heating in the following third welding step is more effective.

It is preferable that the pressure applied in the cooling step (B) is in the range of 3 to 10 MPa. By setting the pressure to be in this range, contact zones between the electrodes and the steel sheets are sufficiently provided, and well-balanced cooling can be performed.

It is preferable that the time Tc2 (cycles/50 Hz) of the cooling step (B) subsequent to the second welding step satisfies a relationship represented by the following inequality (8), $$Tc^1/s < Tc2 \leq Tc1 \quad (8),$$

where Tc1 is the time of the foregoing cooling step (A) subsequent to the first welding. This is intended for maximizing enlargement of the softened zone by setting the heat input in the third welding step, which is performed after the present step, to be smaller than the heat input in the second welding step and by prescribing the cooling time.

Third Welding Step

It is preferable that a third welding step, in which welding is performed again, is performed after the cooling step (B) subsequent to the foregoing second welding step. In this case, it is preferable that $I_3$ (kA), which is the weld current of the third welding step, and $T_3$, which is the weld time of the third welding step, satisfies the relationship represented by the following inequality (7) with respect to $I_{21}$, $I_{22}$ (kA), $T_{21}$, and $T_{22}$, $$I_3 33\ I_3 \times T_3 > I_{21} \times I_{21} \times T_{21} + I_{22} \times I_{22} \times T_{22} \quad (7),$$

where $I_3$ is the weld current (kA) of the third welding step, $I_{21}$ and $I_{22}$ are the weld currents (kA) of the pre-step and the post-step of the foregoing two-step welding, respectively, $T_3$ (s) is the total weld time of the third welding step, and $T_{21}$ (s) and $T_{22}$ (s) are the weld times of the foregoing pre-step and the post-step, respectively.

This is intended for maximizing enlargement of the softened zone by setting the heat input in the third welding step to be larger than the heat input in the second welding step.

When welding of the third welding step is made into two steps and $I_{31}$, which is the weld current in a pre-step of the two steps, satisfies $$Im \leq I_{31} < Im \times 2.0,$$

and $I_{32}$, which is the weld current in a post-step of the two steps, satisfies $$I_{32} < I_{31},$$

the effect can be increased further.

In this case, it is preferable that the following inequality is satisfied, $$I_{31} \times I_{31} \times T_{31} + I_{32} \times I_{32} \times T_{32} > I_{21} \times I_{21} \times T_{21} + I_{22} \times I_{22} \times T_{22} \quad (11),$$

where $T_{21}$ and $T_{22}$ are the weld times of the pre-step and the post-step of the second welding step, respectively, and $T_{31}$ and $T_{32}$ are the weld times (cycles/50 Hz) of the pre-step and the post-step of the third welding step, respectively.

As with inequality (7), inequality (11) is intended for maximizing enlargement of the softened zone by setting the heat input in the third welding step to be larger than the heat input in the second welding step. As with the second welding step, adding an upslope before the weld current $I_{31}$ and adding a downslope after $I_{32}$ in the third welding step are within the scope of the present invention. In a case where an upslope or a downslope is added, it is preferable that the set time of the upslope or the downslope is shorter than $T_3$.

With the present welding method, the effect of the present invention can be further obtained if the tensile strength of at least one of the two or more steel sheets is 440 MPa or more. A still larger effect can be obtained if the tensile strength of at least one of the steel sheets is 980 MPa or more. It is preferable that the carbon equivalent, Ceq, of at least one of the two or more steel sheets is in the range of $0.25 < Ceq < 0.6$. Here, $Ceq = C + \frac{1}{30} \times Si + \frac{1}{20} \times Mn + 2 \times P + 4 \times S$ (unit; mass %).

EXAMPLE 1

As an example of the present invention, as illustrated in the aforementioned FIG. 1, a resistance spot weld was formed by welding the sheet set 3, which included two lapped steel sheets (the lower steel sheet 1 and the upper steel sheet 2), by using a resistance welding machine. The resistance welding machine, which was attached to a C-gun (welding gun), was of a servo motor pressing type using a single-phase current (50 Hz). A pair of electrode tips (the lower electrode tip 4 and the upper electrode tip 5) used in this example were both dome-type electrodes made of an alumina-dispersed copper, each having a radius of curvature of R40 and a diameter of 6 mm at a tip end thereof.

Bare steel sheets each having a thickness in the range of 1.0 to 2.0 mm and of a grade in the range of 440 MPa grade to 1470 MPa grade were used as test pieces. Welding and tensile testing were performed in accordance with JIS Z3137. The conditions for main welding were such that the pressure was 3.5 kN and the time Ta of the first welding step (main welding step) was a constant value in the range of 10 to 16 cycles so that a predetermined nugget could be obtained. In the tables, CTS stands for the fracture strength (cross tension strength) defined in JIS Z3137. Other values, such as a squeeze time or a slope time, were not set. The hold time was set at 1 cycle.

In invention examples, resistance spot welding was performed in accordance with the embodiment of the present invention described above. The definitions of the parameters are shown in FIG. 2. In comparative examples (1), only the main welding was performed. In comparative examples (2), cooling in a non-weld state and welding were repeatedly performed.

Table 1 shows the welding conditions and the results of welding of the invention examples and each comparative example. The cross tension strengths in the invention examples were better than those in the comparative examples (1) and (2).

TABLE 1

| No. | Specifications of Steel Sheet | | | First welding step (Main welding) | | Cooling Step (A) | Second welding step | | | |
|---|---|---|---|---|---|---|---|---|---|---|
| | Tensile Strength/ MPa | Ceq | Total Thickness/ mm | Weld Current $I_m$/kA | Weld Time $T_1$/ cycle | Cooling Time $Tc_1$/ cycle | Weld Current $I_{21}$/kA | Weld Time $T_{21}$/ cycle | Weld Current $I_{22}$/kA | Weld Time $T_{22}$/ cycle |
| 1 | 440 | 0.26 | 3.2 | 7.0 | 10 | — | — | — | — | — |
| 2 | 440 | 0.26 | 3.2 | 7.0 | 10 | 8 | 8.4 | 3 | 7.7 | 2 |
| 3 | 440 | 0.26 | 3.2 | 7.0 | 10 | 8 | 8.4 | 2 | 7.7 | 2 |
| 4 | 590 | 0.28 | 3.2 | 6.0 | 16 | — | — | — | — | — |
| 5 | 590 | 0.28 | 3.2 | 6.0 | 16 | 8 | 9.6 | 1 | 8.4 | 2 |
| 6 | 590 | 0.28 | 3.2 | 6.0 | 16 | 8 | 9.6 | 1 | 8.4 | 2 |
| 7 | 780 | 0.33 | 3.2 | 5.0 | 14 | — | — | — | — | — |
| 8 | 780 | 0.33 | 3.2 | 5.0 | 14 | 10 | 8.0 | 1 | 7.0 | 2 |
| 9 | 780 | 0.33 | 3.2 | 5.0 | 14 | 10 | 8.0 | 1 | 7.0 | 2 |
| 10 | 980 | 0.31 | 2.0 | 4.2 | 14 | — | — | — | — | — |
| 11 | 980 | 0.31 | 2.0 | 4.2 | 14 | 6 | 5.0 | 3 | — | — |
| 12 | 980 | 0.31 | 2.0 | 4.2 | 14 | 6 | 6.3 | 3 | — | — |
| 13 | 980 | 0.31 | 2.0 | 4.2 | 14 | 6 | 6.3 | 1 | 5.9 | 2 |
| 14 | 980 | 0.31 | 2.0 | 4.2 | 14 | 6 | 6.3 | 1 | 5.9 | 2 |
| 15 | 1180 | 0.40 | 3.2 | 6.0 | 14 | — | — | — | — | — |
| 16 | 1180 | 0.40 | 3.2 | 6.0 | 14 | 8 | 8.4 | 3 | — | — |
| 17 | 1180 | 0.40 | 3.2 | 6.0 | 14 | 8 | 8.4 | 1 | 7.2 | 2 |
| 18 | 1180 | 0.40 | 3.2 | 6.0 | 14 | 4 | 6.6 | 2 | 5.4 | 2 |
| 19 | 1180 | 0.40 | 3.2 | 6.0 | 14 | 4 | 7.2 | 1 | 5.4 | 5 |
| 20 | 1180 | 0.40 | 3.2 | 6.0 | 14 | 8 | 8.4 | 1 | 5.4 | 10 |
| 21 | 1180 | 0.40 | 3.2 | 6.0 | 14 | 8 | 7.2 | 3 | 5.4 | 10 |
| 22 | 1180 | 0.40 | 3.2 | 6.0 | 14 | 12 | 10.8 | 2 | 7.8 | 2 |
| 23 | 1180 | 0.40 | 3.2 | 6.0 | 14 | 12 | 10.8 | 2 | 5.4 | 5 |
| 24 | 1180 | 0.40 | 3.2 | 6.0 | 14 | 8 | 9.0 | 1 | 8.4 | 2 |
| 25 | 1180 | 0.40 | 3.2 | 6.0 | 14 | 8 | 9.0 | 1 | 8.4 | 2 |
| 26 | 1180 | 0.40 | 3.2 | 6.0 | 14 | 8 | 9.0 | 2 | 5.4 | 2 |
| 27 | 1180 | 0.40 | 3.2 | 6.0 | 14 | 8 | 9.0 | 2 | 5.4 | 2 |
| 28 | 1180 | 0.40 | 3.2 | 6.0 | 14 | 8 | 8.4 | 2 | 4.8 | 4 |
| 29 | 1180 | 0.45 | 3.2 | 6.5 | 12 | — | — | — | — | — |
| 30 | 1180 | 0.45 | 3.2 | 6.5 | 14 | 8 | 9.8 | 3 | — | — |
| 31 | 1180 | 0.45 | 3.2 | 6.5 | 14 | 8 | 10.4 | 1 | 9.1 | 2 |
| 32 | 1180 | 0.45 | 3.2 | 6.5 | 14 | 8 | 10.4 | 1 | 9.1 | 2 |
| 33 | 1470 | 0.32 | 3.2 | 7.0 | 14 | 8 | 9.8 | 3 | — | — |
| 34 | 1470 | 0.32 | 3.2 | 7.0 | 14 | 8 | 9.8 | 3 | — | — |
| 35 | 1470 | 0.32 | 3.2 | 7.0 | 14 | 8 | 11.2 | 1 | 9.8 | 2 |
| 36 | 1470 | 0.32 | 3.2 | 7.0 | 14 | 8 | 11.2 | 1 | 9.8 | 2 |
| 37 | 1470 | 0.50 | 4.0 | 5.5 | 14 | 8 | — | — | — | — |
| 38 | 1470 | 0.50 | 4.0 | 5.5 | 14 | 18 | 9.9 | 3 | — | — |
| 39 | 1470 | 0.50 | 4.0 | 5.5 | 14 | 8 | 8.8 | 1 | 7.7 | 2 |
| 40 | 1470 | 0.50 | 4.0 | 5.5 | 14 | 18 | 8.8 | 1 | 7.7 | 2 |

| No. | Cooling Step (B) Cooling Time $Tc_2$/cycle | Third welding step | | Number of Repetition/ times | CTS/ kN | Remark |
|---|---|---|---|---|---|---|
| | | Weld Current $I_3$/kA | Weld Time $T_3$/ cycle | | | |
| 1 | — | — | — | — | 10.0 | Comparative Example 1 |
| 2 | — | — | — | — | 12.0 | Invention Example |
| 3 | 8 | 9.8 | 3 | 1 | 12.3 | Invention Example |
| 4 | — | — | — | — | 9.5 | Comparative Example 1 |
| 5 | — | — | — | — | 11.4 | Invention Example |
| 6 | 8 | 9.0 | 3 | 1 | 11.8 | Invention Example |
| 7 | — | — | — | — | 7.5 | Comparative Example 1 |
| 8 | — | — | — | — | 8.8 | Invention Example |
| 9 | 10 | 7.5 | 3 | 1 | 9.0 | Invention Example |
| 10 | — | — | — | — | 3.6 | Comparative Example 1 |
| 11 | 6 | 5.0 | 3 | 1 | 3.8 | Comparative Example 2 |

TABLE 1-continued

| No. | | | | | CTS | |
|---|---|---|---|---|---|---|
| 12 | 6 | 6.3 | 3 | 1 | 4.0 | Comparative Example 2 |
| 13 | — | — | — | — | 4.4 | Invention Example |
| 14 | 6 | 6.3 | 3 | 1 | 4.6 | Invention Example |
| 15 | — | — | — | — | 6.5 | Comparative Example 1 |
| 16 | 8 | 8.4 | 3 | 1 | 9.0 | Comparative Example 2 |
| 17 | — | — | — | — | 10.2 | Invention Example |
| 18 | — | — | — | — | 10.6 | Invention Example |
| 19 | — | — | — | — | 10.9 | Invention Example |
| 20 | — | — | — | — | 10.6 | Invention Example |
| 21 | — | — | — | — | 10.9 | Invention Example |
| 22 | — | — | — | — | 10.1 | Invention Example |
| 23 | — | — | — | — | 10.7 | Invention Example |
| 24 | 8 | 9.0 | 3 | 1 | 10.4 | Invention Example |
| 25 | 8 | 9.0 | 3 | 2 | 10.0 | Invention Example |
| 26 | 8 | 9.0 | 3 | 1 | 10.4 | Invention Example |
| 27 | 8 | 9.0 | 3 | 2 | 10.8 | Invention Example |
| 28 | 8 | 9.0 | 3 | 2 | 10.0 | Invention Example |
| 29 | — | — | — | — | 6.5 | Comparative Example 1 |
| 30 | 8 | 9.8 | 3 | 1 | 9.1 | Comparative Example 2 |
| 31 | — | — | — | — | 9.7 | Invention Example |
| 32 | 8 | 9.8 | 3 | 1 | 10.1 | Invention Example |
| 33 | — | — | — | — | 8.8 | Comparative Example 1 |
| 34 | 8 | 9.8 | 3 | 2 | 10.0 | Comparative Example 2 |
| 35 | — | — | — | — | 11.0 | Invention Example |
| 36 | 8 | 10.5 | 3 | 1 | 11.2 | Invention Example |
| 37 | — | — | — | — | 2.6 | Comparative Example 1 |
| 38 | 18 | 9.9 | 3 | 1 | 2.8 | Comparative Example 2 |
| 39 | 8 | 8.8 | 3 | 1 | 4.2 | Invention Example |
| 40 | 10 | 8.8 | 3 | 1 | 4.2 | Invention Example | cycle; cycles/50 Hz
CTS; Cross Tensile Strength

EXAMPLE 2

As an example of the present invention, as illustrated in the aforementioned FIG. 1, a resistance spot weld was formed by welding the sheet set 3, which included two lapped steel sheets (the lower steel sheet 1 and the upper steel sheet 2), by using a resistance welding machine. The resistance welding machine, which was attached to a C-gun (welding gun), was of a servo motor pressing type using a single-phase current (50 Hz). A pair of electrode tips (the lower electrode tip 4 and the upper electrode tip 5) used in this example were both dome-type electrodes made of an alumina-dispersed copper, each having a radius of curvature of R40 and a diameter of 6 mm at a tip end thereof.

Bare steel sheets each having a thickness of 1.6 mm and of 1180 MPa grade were used as test pieces. Welding and tensile testing were performed in accordance with JIS Z3137. The conditions for main welding were such that the pressure was 3.5 kN and the time Ta of the first welding step (main welding step) was 14 cycles.

Other values, such as a squeeze time or a slope time, were not set. The hold time was set at 1 cycle.

Figure 3:
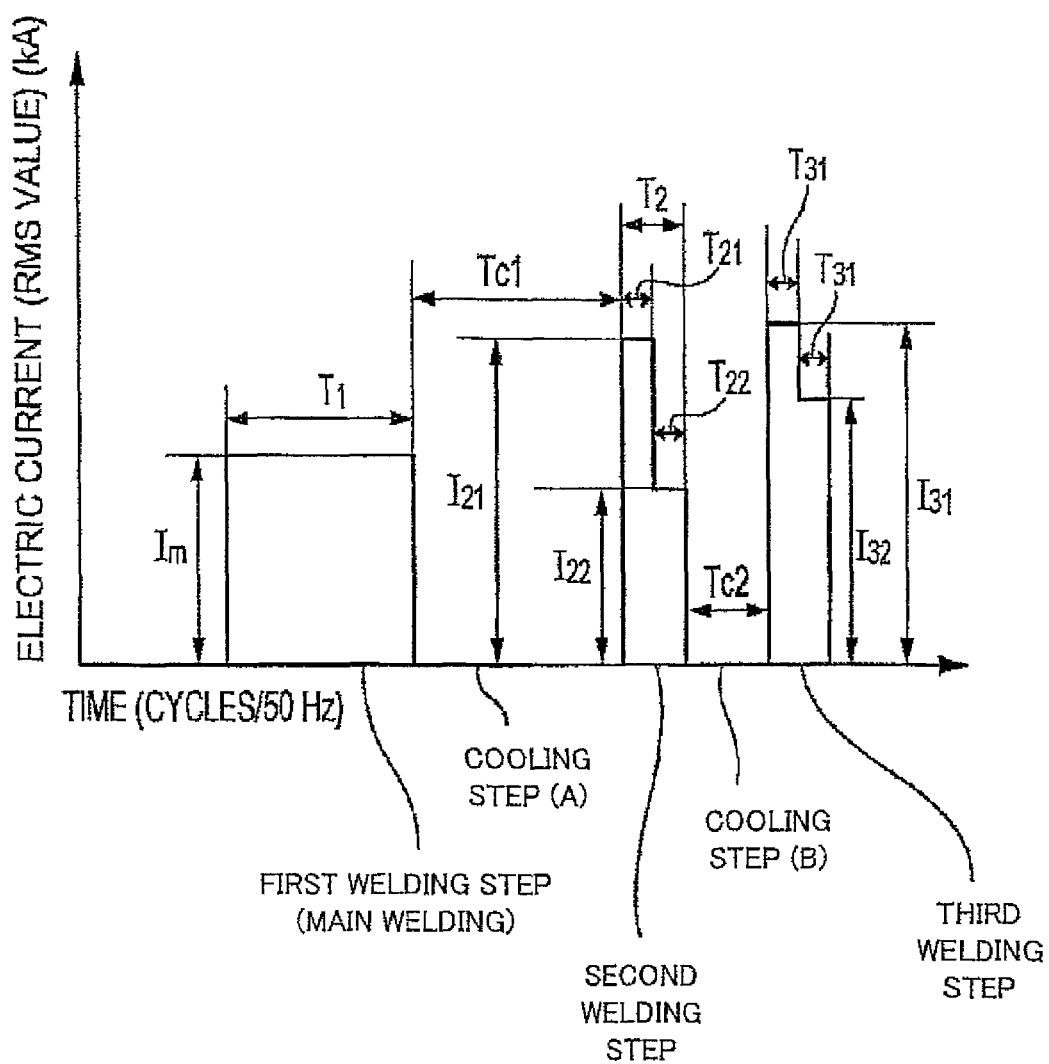
FIG. 3 is a diagram illustrating the relationship between the weld current and the time of steps in an embodiment according to the present invention (EXAMPLE 2).

In invention examples, resistance spot welding was performed in accordance with the embodiment of the present invention described above. The definitions of the parameters are shown in FIG. 3. FIG. 3 illustrates an example in which two-step welding is performed in the third welding step instead of one-step welding. In comparative examples (1), only the main welding was performed. In comparative examples (2), cooling in a non-weld state and welding were repeatedly performed.

Table 2 shows the welding conditions and the results of welding of the invention examples and the comparative examples. In the table, CTS stands for the fracture strength (cross tension strength) defined in JIS Z3137. The cross tension strengths in the invention examples were better than those in the comparative examples (1) and (2).

TABLE 2

| | Specifications of Steel Sheet | | | First welding step (Main welding) | | Cooling step (A) | Second welding step | |
|---|---|---|---|---|---|---|---|---|
| No. | Tensile Strength/ MPa | Ceq | Total Thickness/ mm | Weld current Im/ kA | Weld time $T_1$/cycle | Cooling time Tc1/cycle | Weld current $I_{21}$/kA | Weld time $T_{21}$/cycle |
| 1 | 1180 | 0.40 | 3.2 | 6.0 | 14 | — | — | — |
| 2 | 1180 | 0.40 | 3.2 | 6.0 | 14 | 8 | 8.4 | 3 |
| 3 | 1180 | 0.40 | 3.2 | 6.0 | 14 | 8 | 8.4 | 2 |
| 4 | 1180 | 0.40 | 3.2 | 6.0 | 14 | 8 | 8.4 | 2 |
| 5 | 1180 | 0.40 | 3.2 | 6.0 | 14 | 8 | 8.4 | 2 |
| 6 | 1180 | 0.40 | 3.2 | 6.0 | 14 | 8 | 8.4 | 2 |
| 7 | 1180 | 0.40 | 3.2 | 6.0 | 14 | 8 | 10.8 | 1 |
| 8 | 1180 | 0.40 | 3.2 | 6.0 | 14 | 8 | 8.4 | 2 |

TABLE 2-continued

| No. | Second welding step Weld current $I_{22}$/kA | Second welding step Weld time $T_{22}$/cycle | Cooling step (B) Cooling time Tc2/cycle | Third welding step Weld current $I_{31}$/kA | Third welding step Weld time $T_{31}$/cycle | Third welding step Weld current $I_{32}$/kA | Third welding step Weld time $T_{32}$/cycle | CTS/ kN | Remarks |
|---|---|---|---|---|---|---|---|---|---|
| 1 | — | — | — | — | — | — | — | 6.5 | Comparative Example 1 |
| 2 | — | — | 8 | 8.4 | 3 | — | — | 9.0 | Comparative Example 2 |
| 3 | 7.2 | 2 | 8 | 9.0 | 2 | 7.2 | 2 | 12.0 | Invention Example |
| 4 | 7.2 | 2 | 8 | 8.4 | 3 | 7.2 | 2 | 11.8 | Invention Example |
| 5 | 5.4 | 5 | 8 | 8.4 | 3 | 5.4 | 5 | 12.1 | Invention Example |
| 6 | 5.4 | 5 | 8 | 8.4 | 3 | 7.2 | 2 | 12.0 | Invention Example |
| 7 | 7.8 | 2 | 6 | 10.8 | 1 | 8.4 | 2 | 11.9 | Invention Example |
| 8 | 7.2 | 2 | 4 | 9.0 | 2 | 7.2 | 2 | 11.5 | Invention Example | cycle; cycles/50 Hz
CTS; Cross Tensile Strength

REFERENCE SIGNS LIST 1 lower steel sheet
2 upper steel sheet
3 sheet set
4 lower electrode
5 upper electrode
6 nugget
d nugget diameter
t total thickness

The invention claimed is:

1. A method of resistance spot welding a sheet set of two or more lapped steel sheets by welding the sheet set while clamping and pressing the sheet set between a pair of welding electrodes, the method sequentially comprising:
    a first welding step of applying an weld current Im (kA) and forming a nugget having a nugget diameter d (mm) that satisfies the following inequality (1);
    a cooling step (A), subsequent to the first welding step, of cooling the sheet set while continuing to press the sheet set; and
    a second welding step of performing two-step welding of applying weld currents that satisfy the following inequalities (2) and (3), $$3\times\sqrt{t_m} \leq d \leq 6\times\sqrt{t_m} \quad (1),$$

where $t_m$ is the thickness (mm) of the thinnest one of the two or more steel sheets, $$Im < I_{21} < Im \times 2.0 \quad (2)$$

$$I_{22} < I_{21} \quad (3),$$

where $I_{21}$ and $I_{22}$ are respectively the weld currents (kA) of a pre-step and a post-step of the two-step welding.

2. The method of resistance spot welding according to claim 1, wherein a time Tc1 of the cooling step (A) subsequent to the first welding step satisfies the following inequality (4), $$t/2 < Tc1 < t \times 5 \quad (4),$$

where t is the total thickness (mm) of the sheet set and the unit of time is (cycles/50 Hz).

3. The method of resistance spot welding according to claim 1, wherein a total weld time $T_2$ of the second welding step satisfies the following equation (5) and inequality (6), $$T_2 = T_{21} + T_{22} \quad (5),$$

where $T_{21}$ and $T_{22}$ are respectively weld times of the pre-step and the post-step, $$T_2 < t \times 5 \quad (6),$$

where t is the total thickness (mm) of the sheet set and the unit of time is (cycles/50 Hz).

4. The method of resistance spot welding according to any one of claim 1, further sequentially comprising:
    a cooling step (B) of continuing to press the sheet set after the second welding step; and
    a third welding step of applying an weld current that satisfies the following inequality (7), $$I_3{}^3 3 I_3 \times T_3 \geq I_{21} \times I_{21} \times T_{21} + I_{22} \times I_{22} \times T_{22} \quad (7),$$

where $I_3$ is the weld current (kA) of the third welding step, $I_{21}$ and $I_{22}$ are respectively the weld currents (kA) of the pre-step and the post-step of the two-step welding, $T_3$ is an weld time of the third welding step, $T_{21}$ and $T_{22}$ are respectively the weld times of the pre-step and the post-step, and the unit of time is (cycles/50 Hz).

5. The method of resistance spot welding according to claim 4, wherein a time Tc2 of the cooling step (B) subsequent to the second welding step satisfies the following inequality (8), $$Tc1/5 < Tc2 \leq Tc1 \quad (8),$$

where Tc1 is the time of the cooling step (A) subsequent to the first welding step, and the unit of time is (cycles/50 Hz).

6. The method of resistance spot welding according to claim 4, wherein two-step welding is performed in the third welding step instead of one welding.

7. The method of resistance spot welding according to claim 4, wherein the cooling step (B) subsequent to the second welding step and the third welding step are repeated once or twice.

8. The method of resistance spot welding according to claim 1, wherein at least one of the two or more steel sheets satisfies the following inequality, $$0.25 < Ceq < 0.6,$$

where $Ceq = C + 1/30 \times Si + 1/20 \times Mn + 2 \times P + 4 \times S$ (%), in which the right side is the contents (mass %) of elements included in the at least one of the steel sheets.

* * * * *